United States Patent
Nakano et al.

(10) Patent No.: US 9,296,868 B2
(45) Date of Patent: Mar. 29, 2016

(54) POLYESTER FILM

(71) Applicant: TOYOBO CO., LTD., Osaka-shi, Osaka (JP)

(72) Inventors: Mahiro Nakano, Inuyama (JP); Tadashi Nakaya, Inuyama (JP); Toshiyuki Shimizu, Otsu (JP); Yoshitomo Ikehata, Inuyama (JP)

(73) Assignee: Toyobo Co., Ltd., Osaka (JP)

( * ) Notice: Subject to any disclaimer, the term of this patent is extended or adjusted under 35 U.S.C. 154(b) by 0 days.

(21) Appl. No.: 14/418,273

(22) PCT Filed: Sep. 25, 2013

(86) PCT No.: PCT/JP2013/075808
§ 371 (c)(1),
(2) Date: Jan. 29, 2015

(87) PCT Pub. No.: WO2014/050844
PCT Pub. Date: Apr. 3, 2014

(65) Prior Publication Data
US 2015/0259484 A1    Sep. 17, 2015

(30) Foreign Application Priority Data

Sep. 27, 2012  (JP) .................. 2012-214141

(51) Int. Cl.
| | |
|---|---|
| C08J 9/00 | (2006.01) |
| C08J 5/18 | (2006.01) |
| B29C 55/14 | (2006.01) |
| C08J 11/04 | (2006.01) |
| B29K 67/00 | (2006.01) |
| B29K 105/26 | (2006.01) |

(52) U.S. Cl.
CPC . *C08J 5/18* (2013.01); *B29C 55/14* (2013.01); *B29K 2067/003* (2013.01); *B29K 2105/26* (2013.01); *C08J 2367/02* (2013.01); *C08J 2367/03* (2013.01)

(58) Field of Classification Search
CPC .............. C08G 18/168; C08G 18/089
USPC .............................................. 521/48
See application file for complete search history.

(56) References Cited

U.S. PATENT DOCUMENTS

2012/0088112 A1    4/2012   Ito et al.
2015/0175756 A1*   6/2015   Haruta et al.

FOREIGN PATENT DOCUMENTS

| JP | H07-114721 A | 5/1995 |
|---|---|---|
| JP | H11-010723 A | 1/1999 |
| JP | H11-107723 A | 1/1999 |
| JP | 2001-239579 A | 9/2001 |
| JP | 2001-342267 A | 12/2001 |
| JP | 2005-314557 A | 11/2005 |
| JP | 2006-241349 A | 9/2006 |
| JP | 2008-095084 A | 4/2008 |
| JP | 2010-260315 A | 11/2010 |
| JP | 2012-091862 A | 5/2012 |

OTHER PUBLICATIONS

European Patent Office, Communication pursuant to Article 94(3) EPC in European Patent Application No. 13 841 399.2 (Jun. 22, 2015).
Japanese Patent Office, International Search Report in International Patent Application No. PCT/JP2013/075808 (Dec. 10, 2013).

* cited by examiner

*Primary Examiner* — Terressa Boykin
(74) *Attorney, Agent, or Firm* — Leydig, Voit & Mayer, Ltd.

(57) ABSTRACT

It is provided that a polyester film containing a polyester resin obtained by recycling PET bottles and having high lamination strength and slight unevenness in thickness. A biaxially stretched polyester film comprising 50 wt. % or more and 95 wt. % or less of a polyester resin obtained by recycling PET bottles, wherein the content of an isophthalic acid component in all dicarboxylic acid components in the entire polyester resin composing the polyester film is 0.5 mol % or more and 5.0 mol % or less, and the polyester satisfy the specific intrinsic viscosity, the specific thermal shrinkage rate, the specific refractive index in the thickness direction, and the specific unevenness in thickness.

2 Claims, 1 Drawing Sheet

POLYESTER FILM

TECHNICAL FIELD

The present invention relates to a polyester film containing a polyester resin obtained by recycling PET bottles. More particularly, the present invention relates to a polyester film containing a polyester resin obtained by recycling PET bottles and having low thermal shrinkage rate, high lamination strength, and slight unevenness in thickness.

BACKGROUND ART

Conventionally, there has been known a technique for obtaining a polyester film for wrap-around labels that cause few troubles due to static electricity from a polyester with a low oligomer content without deteriorating the productivity and quality, by using a polyester resin obtained by recycling PET bottles (for example, see Patent Document 1). However, such a conventional technique is used for producing a film with low intrinsic viscosity (IV=0.62) using a raw material resin with high intrinsic viscosity (IV=0.70) by extrusion at a low extrusion temperature (280° C.), so that the composition of the inside of the film is uneven, which causes uneven lamination surface and unevenness in thickness. Further, in this technique, a film after biaxial stretching is subjected to a heat treatment at a high temperature in order to obtain high lamination strength. However, since the film is cooled to room temperature abruptly, there occur problems that relaxation of the film is nonuniform in the plane and that the unevenness in thickness is caused.

Further, there has been known a technique for controlling orientation of a film to provide a polyester film for transparent deposition suitable for adhesion of a deposited film to the polyester film and for boiling and retort treatment (for example, see Patent Document 2). However, such a conventional technique is an example of poly(ethylene terephthalate) that does not use a polyester resin obtained by recycling PET bottles, and in the case where a film is produced by using a resin same as the recycled resin and having an intrinsic viscosity of 0.63, the composition of the inside of the film is uneven, so that it results in generation of unevenness in a lamination surface or unevenness in thickness. Further, in this technique, a film after biaxial stretching is subjected to a heat treatment at a high temperature in order to obtain high lamination strength. However, since the film is cooled to room temperature abruptly, there occur problems that relaxation of the film is nonuniform in the plane and that the unevenness in thickness is caused.

Furthermore, there has been known a technique for making slitting property and cutting property in the calendering process good in a magnetic recording medium by controlling particles in a film and film production conditions (for example, see Patent Document 3). However, such a conventional technique is an example of poly(ethylene terephthalate) that does not use a polyester resin obtained by recycling PET bottles, and in the case where a film is produced by using a resin same as the recycled resin and having an intrinsic viscosity of 0.62, the composition of the inside of the film is uneven, so that it results in generation of unevenness in a lamination surface or unevenness in thickness. Further, in this technique, a film after biaxial stretching is subjected to a heat treatment at a high temperature in order to obtain high lamination strength. However, since the film is cooled to room temperature abruptly, there occur problems that relaxation of the film is nonuniform in the plane and that the unevenness in thickness is caused.

Still further, there has been known a technique for improving the heat dimensional stability at the time of producing a ceramic sheet to be used for a release sheet whose heat shrinkage is optimized by optimizing the lengthwise and transverse stretching condition and the heat treatment condition of the film (for example, see Patent Document 4). However, such a conventional technique is an example of poly(ethylene terephthalate) that does not use a polyester resin obtained by recycling PET bottles, and in the case where a film is produced by using a resin same as the recycled resin and having an intrinsic viscosity of 0.62, the composition of the inside of the film is uneven, so that it results in generation of unevenness in a lamination surface or unevenness in thickness. Moreover, there has been disclosed a technical idea of carrying out a heat treatment at a high temperature for a film after biaxial stretching and optionally carrying out cooling after the heat treatment to obtain high lamination strength. However, in the case of a film containing 0.5 mol % or more and 5 mol % or less of isophthalic acid, if this technique is employed as it is, relaxation of the film is nonuniform in the plane and the unevenness in thickness is caused. It is further disclosed that the refractive index (Nz) in the thickness direction is controlled to keep flatness of a film, but in this document, a case where poly(ethylene terephthalate) accounts for 100% and Nz is 1.493 or less is assumed. A film containing 0.5 mol % or more and 5 mol % or less of isophthalic acid is advantageous in that it easily provides sufficient lamination strength as compared with a poly(ethylene terephthalate) film containing 0 mol % of isophthalic acid, but its Nz is too high to improve lamination strength and reduce unevenness in thickness simultaneously. Accordingly, this technique cannot be employed as it is.

PRIOR ART DOCUMENTS

Patent Documents

Patent Document 1: JP-A No. 2012-91862
Patent Document 2: JP-A No. 2001-342267
Patent Document 3: JP-A No. hei-07-114721
Patent Document 4: JP-A No. 2010-260315

SUMMERY OF THE INVENTION

Problems to be Solved by the Invention

The present invention has been made in view of the above problems of the conventional techniques. That is, it is an object of the present invention to provide a polyester film as mentioned below:

1. To optimize the extrusion temperature to stabilize extrusion of the resin, homogenize the resin, additives, and particles in the film to reduce unevenness in thickness of the film, and eliminate unevenness in a laminate to improve lamination strength, even if a recycled resin obtained by recycling PET bottles which contain 0.5 mol % or more and 5.0 mol % or less of isophthalic acid, has high melt viscosity, has been subjected to solid-phase polymerization, and is often mixed with a high crystallization nucleating agent and the like is used;
2. To carry out lengthwise stretching at a high stretch ratio and at a high temperature to make transverse stretching at a high stretch ratio possible even if the melt viscosity of the resin after extrusion is high, and to reduce unevenness in thickness of the film;
3. To carry out transverse stretching at a high temperature to make transverse stretching at a high stretch ratio possible even if the melt viscosity of the resin after extrusion is high, and to reduce unevenness in thickness of the film;
4. To carry out a heat treatment at a high temperature to lower lengthwise and transverse thermal shrinkage rates of the film;
5. To properly adjust the refractive index of the film in the thickness direction by stretching at a high temperature and at a high ratio and carrying out a heat treatment at a high temperature to realize high lamination strength; and
6. To carry out gradual cooling after the heat treatment to reduce unevenness in thickness of the film containing 0.5 mol % or more and 5.0 mol % or less of isophthalic acid as an acid component.

Another object of the present invention is to provide an excellent polyester film containing a polyester resin obtained by recycling PET bottles without unevenness in lamination strength in the inside of the film.

Solutions to the Problems

For solving the above-described problems, the present inventors have conducted extensive studies, and resultantly have completed the present invention. That is, the present invention is configured as follows.
1. A biaxially stretched polyester film comprising 50 wt. % or more and 95 wt. % or less of a polyester resin obtained by recycling PET bottles, the polyester film satisfying the following requirements:
(1) the content of an isophthalic acid component in all dicarboxylic acid components in the entire polyester resin composing the polyester film is 0.5 mol % or more and 5.0 mol % or less;
(2) the intrinsic viscosity of the resin composing the polyester film is 0.64 dl/g or more and 0.80 dl/g or less;
(3) the thermal shrinkage rate at 150° C. in the lengthwise direction and the transverse direction is 0.1% or more and 1.5% or less;
(4) the refractive index of the polyester film in the thickness direction is 1.4930 or more and 1.4995 or less; and
(5) the unevenness in thickness calculated according to the following equation is 16% or less in both the lengthwise and transverse directions, in the case where each thickness Tn (n=1 to 200) (unit: μm) of a film of 1 m in length and 1 m in width is measured at every 5 mm and at 200 points, and the maximum thickness is defined as Tmax, the minimum thickness is defined as Tmin, and the average thickness is defined as Tave:

Unevenness in thickness=$\{(T\text{max}-T\text{min})/T\text{ave}\} \times 100(\%)$.

2. The polyester film according to above 1, wherein the polyester film contains 0.01 wt. % or more and 1 wt. % or less of inorganic particles.

Effects of the Invention

The polyester film containing a polyester resin obtained by recycling PET bottles according to the present invention has the following effects.
1. To optimize the extrusion temperature to stabilize extrusion of the resin, homogenize the resin, additives, and particles in the film to reduce unevenness in thickness of the film, and eliminate unevenness in a laminate to improve lamination strength, even if a recycled resin obtained by recycling PET bottles which contain 0.5 mol % or more and 5 mol % or less of isophthalic acid, has high melt viscosity, has been subjected to solid-phase polymerization, and is often mixed with a high crystallization nucleating agent is used;
2. To carry out lengthwise stretching at a high stretch ratio and at a high temperature to make transverse stretching at a high stretch ratio possible even if the melt viscosity of the resin after extrusion is high, and to reduce unevenness in thickness of the film;
3. To carry out transverse stretching at a high temperature to make transverse stretching at a high stretch ratio possible even if the melt viscosity of the resin after extrusion is high, and to reduce unevenness in thickness of the film;
4. To carry out a heat treatment at a high temperature to be able to lower lengthwise and transverse thermal shrinkage rates of the film;
5. To properly adjust the refractive index of the film in the thickness direction by stretching at a high temperature and at a high ratio and carrying out a heat treatment at a high temperature to realize high lamination strength; and
6. To carry out gradual cooling after the heat treatment to reduce unevenness in thickness of the film containing 0.5 mol % or more and 5.0 mol % or less of isophthalic acid as an acid component.

Also, there is no unevenness in lamination strength in the inside of the film.

MODE FOR CARRYING OUT THE INVENTION

A biaxial stretching method is not particularly limited, and a tubular method and a simultaneous biaxial stretching method may be employed. A successive biaxial stretching method is preferable.

The lower limit of the intrinsic viscosity of the resin composing a film measured by measuring the film is preferably 0.64 dl/g, more preferably 0.65 dl/g. If the intrinsic viscosity is less than 0.64 dl/g, at the time of producing a film using a recycled resin derived from PET bottles, a decrease in the viscosity may sometimes result in an undesirable defect of uneven thickness since many of the recycled resins derived from PET bottles have an intrinsic viscosity exceeding 0.70. Further, coloration of the film may occur, and therefore, it is not preferable. The upper limit of the intrinsic viscosity is preferably 0.80 dl/g, more preferably 0.70 dl/g. If it exceeds 0.80 dl/g, the resin is difficult to be discharged out of an extruder and the productivity may be deteriorated, and therefore, it is not preferable.

The lower limit of the thickness is preferably 8 μm, more preferably 10 μm, and still more preferably 12 μm. If the film is thinner than 8 μm, the strength as a film may be insufficient, and therefore, it is not preferable. The upper limit of the thickness is preferably 200 μm, more preferably 50 μm, and still more preferably 30 μm. If it exceeds 200 μm, the film is so thick that processing may become difficult.

The lower limit of the thermal shrinkage rate in the lengthwise direction (sometimes referred to as MD) and in the transverse direction (sometimes referred to as TD) is preferably 0.1%, more preferably 0.3%. If it is less than 0.1%, the effect of improvement is saturated, and besides, the film sometimes becomes mechanically fragile, and therefore, it is not preferable. The upper limit of the thermal shrinkage rate is preferably 1.5%, more preferably 1.2%. If it exceeds 1.5%, pitch deviation may be caused due to the dimensional change at the time of processing such as printing, and therefore, it is not preferable. Further, ff it exceeds 1.5%, shrinkage in the width direction may occur due to the dimensional change at the time of processing such as printing, and therefore, it is not preferable.

The lower limit of the refractive index in the thickness direction is preferably 1.493, more preferably 1.494. If it is less than 1.493, orientation is too high and desired lamination strength may not be obtained. The upper limit of the refractive index is preferably 1.4995, more preferably 1.498. If it exceeds 1.4995, the molecular orientation of the film is insufficient and mechanical characteristics may be insufficient, and therefore, it is not preferable.

The unevenness in thickness calculated according to the following equation in the case where the thickness Tn (n=1 to 200) (unit: μm) of a film of 1 m in length and 1 m in width is measured at every 5 mm and at 200 points, and the maximum thickness is defined as Tmax, the minimum thickness is defined as Tmin, and the average thickness is defined as Tave is preferably 16% or less, more preferably 12% or less, and still more preferably 10% or less in both the lengthwise and transverse directions. If it exceeds 16%, winding deviation may occur at the time of winding the film in a film roll, or the appearance of the release surface may become poor when a laminated part is separated and the product value may be deteriorated, and therefore, it is not so preferable.

$$\text{Unevenness in thickness} = \{(T\max - T\min)/T\text{ave}\} \times 100(\%)$$

The lower limit of the lamination strength is preferably 4.0 N/15 mm, more preferably 4.5 N/15 mm, and still more preferably 5 N/15 mm. If it is less than 4.0 N/15 mm, in the case where the film is used for producing a bag, the laminate part tends to be separated easily, and therefore, it is not preferable. The upper limit of the lamination strength is preferably 20 N/15 mm, more preferably 15 N/15 mm, and still more preferably 10 N/15 mm. If it exceeds 20 N/15 mm, the film may be substantially broken at the time of peeling, and therefore, it is not so preferable.

The appearance evaluation after the lamination is carried out by visually observing a sample after laminate separation. The evaluation is performed as follows. The ○ level means that there are no micro voids of the adhesive in the surface after separation: the Δlevel means that there are micro voids in 10% or less of the total separated surface area: and the x level means that there are micro voids in more than 10% of the total separated surface area. The Δlevel is preferable, and the ○ level is more preferable. The x level is not preferable since the appearance is poor after separation of the laminate part and the product value is deteriorated. In the case where the lamination strength is less than 4 N/15 mm, since the basic characteristics of the present invention are not satisfied, the film is not preferable even if it is on the ○ level.

It is preferable to use, as a raw material, a recycled polyester resin derived from PET bottles containing an isophthalic acid component as an acid component. The crystallinity of a polyester used for PET bottles is controlled to improve the bottle appearance, and as a result, a polyester containing 10 mol % or less of an isophthalic acid component is used in some cases. To utilize a recycled resin, a material containing an isophthalic acid component is used in some cases.

The lower limit of the amount of a terephthalic acid component in all dicarboxylic acid components composing the polyester resin contained in the film is preferably 95 mol %, more preferably 96 mol %, still more preferably 96.5 mol %, and particularly preferably 97 mol %. If it is less than 95 mol %, crystallinity is deteriorated, so that the thermal shrinkage rate may increase, and it is not so preferable. The lower limit of the amount of the terephthalic acid component in the polyester resin contained in the film is preferably 99.5 mol %, more preferably 99 mol %. Since many of the recycled polyester resins derived from PET bottles contain dicarboxylic acid components typified by isophthalic acid besides terephthalic acid, an amount of the terephthalic acid component composing the polyester resin in the film exceeding 99.5 mol % consequently makes it difficult to produce a polyester film containing a recycled resin at a high rate, and therefore, it is not so preferable.

The lower limit of the amount of the isophthalic acid component in all the dicarboxylic acid components composing the polyester resin contained in the film is preferably 0.5 mol %, more preferably 0.7 mol %, still more preferably 0.9 mol %, and particularly preferably 1 mol %. Since many of recycled polyester resins derived from PET bottles contain an isophthalic acid component, an amount of the isophthalic acid component composing the polyester resin in the film of less than 0.5 mol % consequently makes it difficult to produce a polyester film containing a recycled resin at a high rate, and therefore, it is not so preferable. The upper limit of the amount of the isophthalic acid component in all the dicarboxylic acid components composing the polyester resin contained in the film is preferably 5 mol %, more preferably 4 mol %, still more preferably 3.5 mol %, and particularly preferably 3 mol %. If it exceeds 5 mol %, crystallinity is deteriorated, so that the thermal shrinkage rate may increase, and it is not so preferable. Adjustment of the content of the isophthalic acid component to be within the above-mentioned range makes production of a film excellent in lamination strength and shrinkage rate, and reduced in unevenness in thickness easy, and therefore, it is preferable.

The upper limit of the intrinsic viscosity of the recycled resin derived from PET bottles is preferably 0.9 dl/g, more preferably 0.8 dl/g, still more preferably 0.77 dl/g, and particularly preferably 0.75 dl/g. If it exceeds 0.9 dl/g, the resin may become difficult to be discharged out of an extruder and the productivity may be deteriorated, and therefore, it is not so preferable.

The lower limit of the content of the polyester resin obtained by recycling PET bottles relative to the film is preferably 50 wt. %, more preferably 65 wt. %, and still more preferably 75 wt. %. If it is less than 50 wt. %, the content is too low for utilization of the recycled resin, and it is not so preferable in terms of contribution to environmental preservation. The upper limit of the content of the polyester resin obtained by recycling PET bottles is preferably 95 wt. %, more preferably 90 wt. %, and still more preferably 85 wt. %. If it exceeds 95 wt. %, it is sometimes impossible to sufficiently add a lubricant or an additive such as inorganic particles for improving the function as a film, and therefore, it is not so preferable. Additionally, a polyester resin obtained by recycling PET bottles may be used as a master batch (a resin to be contained in a high concentration) to be used in the case where a lubricant or an additive such as inorganic particles is added for improving the function as a film.

As the kind of the lubricant, inorganic lubricants such as silica, calcium carbonate, and alumina, and also organic lubricants are preferable, and silica and calcium carbonate are more preferable. These lubricants provide transparency and slippage.

The lower limit of the lubricant content in the film is preferably 0.01 wt. %, more preferably 0.015 wt. %, and still more preferably 0.02 wt. %. If it is less than 0.01 wt. %, the slippage may be deteriorated. The upper limit of the lubricant content is preferably 1 wt. %, more preferably 0.2 wt. %, and still more preferably 0.1 wt. %. If it exceeds 1 wt. %, transparency may be deteriorated, and it is not so preferable.

A method for producing the film of the present invention is not particularly limited, but the following production method is recommended. It is important to set a temperature suitable for melting and extruding a resin in an extruder. The basic idea is that (1) deterioration is suppressed by extrusion at a temperature as low as possible, since a polyester resin used for PET bottles contains an isophthalic acid component, and (2) a part for melting at a high temperature and high pressure is kept to sufficiently and evenly melt highly crystalline micro parts with high intrinsic viscosity. Addition of the isophthalic acid component leads to deterioration of the tacticity of a polyester and a decrease in the melting point. Therefore, extrusion at a high temperature results in a significant decrease in melt viscosity or deterioration by heat, and also in a decrease in the mechanical strength and an increase in foreign matters resulting from the deterioration. Further, sufficient melt-kneading is impossible merely by lowering the extrusion temperature, and it may result in problems of an increase in unevenness in thickness and foreign matters such as fish eyes. Accordingly, a recommended production method may be, for example, a method of using two extruders in tandem, a method of increasing the pressure in a filter part, or a method of using a screw with high shear force for part of screw equipment. Hereinafter, an example of controlling the temperature using a single extruder will be described.

Figure 1:
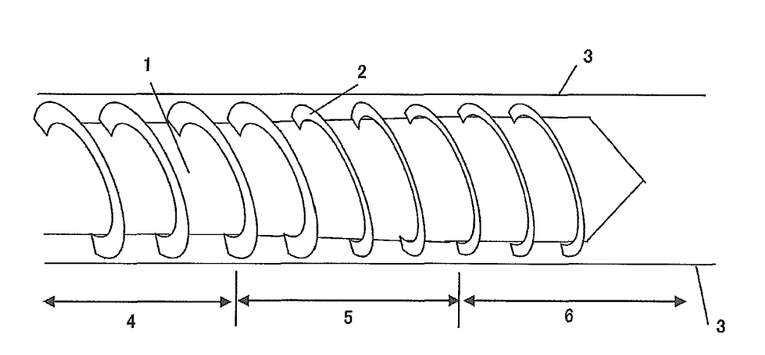
FIG. 1 A schematic drawing showing one embodiment of the inside of an extruder in a film production facility in the present invention.

FIG. 1 shows one embodiment of the inside of an extruder in a film production facility in the present invention. In a screw 1 having a flight 2 between barrels 3, the screw 1 includes a supply part 4, a compaction part 5, and a measurement part 6 from the base to the tip end thereof. The compaction part 5 is a region where the distance between the screw 1 and the barrels 3 is gradually narrowed. In the present invention, the extruder is preferably contrived to sufficiently carry out melt-kneading in the compaction part 5 in which the shear force is high, and to avoid thermal deterioration in the supply part 4 and the measurement part 6, by setting the temperature in the supply part 4 and the measurement part 6 as low as possible and setting the temperature in the compaction part 5 high.

The lower limit of the set temperature in the resin melting part (excluding the highest set temperature in the compaction part of the screw in the extruder) in the extruder is preferably 270° C., and the upper limit thereof is preferably 290° C. If it is less than 270° C., extrusion becomes difficult, and if it exceeds 290° C., the resin may be deteriorated, and therefore, it is not so preferable.

The lower limit of the highest set temperature in the compaction part of the screw in the extruder is preferably 295° C. In a polyester resin used for PET bottles, crystals with high melting points (260° C. to 290° C.) often exist in terms of transparency. Further, an additive, a crystallization nucleating agent, and the like are added, and unevenness in the fine melting behavior is observed in the resin material. If the highest set temperature is less than 295° C., it becomes difficult to sufficiently melt them, and therefore, it is not so preferable. The upper limit of the highest set temperature in the compaction part of the screw in the extruder is preferably 310° C. If it exceeds 310° C., the resin may be deteriorated, and therefore, it is not so preferable.

The lower limit of the time for the resin to pass the region at the highest set temperature in the compaction part of the screw in the extruder is preferably 10 sec., more preferably 15 sec. If it is shorter than 10 sec., the polyester resin used for PET bottles cannot be melted sufficiently, and therefore, it is not so preferable. The upper limit of the time is preferably 60 sec., more preferably 50 sec. If it exceeds 60 sec., the resin may be easily deteriorated, and therefore, it is not so preferable. It is made possible to obtain a film reduced in unevenness in thickness, foreign matters such as fish eyes, and coloration by setting an extruder in such ranges even if a large quantity of a polyester resin obtained by recycling PET bottles is used.

A resin melted in the above-mentioned manner is extruded in a sheet-like form on a cooling roll, and thereafter biaxially stretched. The stretching method may be a simultaneous biaxial stretching method, but a successive biaxial stretching method is preferable. In the above-mentioned manner, it is made easy to satisfy both productivity and the quality required in the present invention.

A method for stretching the film in the present invention is not particularly limited, but the following points are important. To stretch a resin having an intrinsic viscosity of 0.64 dl/g or more and containing an isophthalic acid component, the stretch ratios and temperatures in the lengthwise direction (MD) stretching and transverse direction (TD) stretching are important. If the MD stretch ratio and temperature are improper, stretching force is not evenly applied, and the orientation of molecules is insufficient, which may result in an increase in unevenness in thickness or insufficiency of mechanical characteristics. Further, the film may be torn in the next TD stretching step, or unevenness in thickness may be increased extremely. If the TD stretch ratio and temperature are improper, stretching is not carried out evenly, balance of the lengthwise and transverse orientation is deteriorated, and the mechanical characteristics may be insufficient. Further, in the case where the next heat fixation step is performed in the state that the unevenness in thickness is significant or the molecular chain orientation is insufficient, relaxation cannot be carried out evenly, and problems of more significant unevenness in thickness and insufficient mechanical characteristics may be caused. Accordingly, basically, it is recommended to carry out the stretching step by step in the MD stretching after carrying out the temperature adjustment as follows, and carry out the stretching in the TD stretching at a proper temperature so that the orientation balance is not extremely deteriorated. Hereinafter, one embodiment will be described, but the description is not to be construed as limiting the invention.

A method for stretching the film in the lengthwise direction (MD) is preferably a roll stretching method or an IR heating method.

The lower limit of the MD stretching temperature is preferably 100° C., more preferably 110° C., and still more preferably 120° C. If it is less than 100° C., even if a polyester resin with an intrinsic viscosity of 0.64 dl/g or more is stretched to orient molecules in the lengthwise direction, the film may be torn in the next transverse stretching step or an extreme thickness defect may be caused, and therefore, it is not preferable. The upper limit of the MD stretching temperature is preferably 140° C., more preferably 135° C., and still more preferably 130° C. If it exceeds 140° C., orientation of molecular chains may become insufficient and mechanical characteristics may become insufficient, and therefore, it is not so preferable.

The lower limit of the MD stretch ratio is preferably 2.5 times, more preferably 3.5 times, and still more preferably 4 times. If it is less than 2.5 times, even if a polyester resin with an intrinsic viscosity of 0.64 dl/g or more is stretched to orient molecules in the lengthwise direction, the film may be torn in the next transverse stretching step or an extreme thickness defect may be caused, and therefore, it is not so preferable. The upper limit of the MD stretch ratio is preferably 5 times, more preferably 4.8 times, and still more preferably 4.5 times.

If it exceeds 5 times, the effect of improving mechanical strength and unevenness in thickness may be saturated, and it is not so meaningful.

An MD stretching method may be the above-mentioned one-stage stretching, but the film is preferably stretched in two or more stages. Stretching in two or more stages makes it possible to well stretch a polyester resin with high intrinsic viscosity derived from a recycled resin containing isophthalic acid, and to reduce the unevenness in thickness and improve lamination strength and mechanical characteristics.

The lower limit of the MD stretching temperature in the first stage is preferably 110° C., more preferably 115° C. If it is less than 110° C., heat is insufficient, so that vertical stretching cannot be carried out sufficiently and the film becomes poor in the flatness, and therefore, it is not preferable. The upper limit of the MD stretching temperature in the first stage is preferably 125° C., more preferably 120° C. If it exceeds 125° C., orientation of molecular chains may become insufficient and mechanical characteristics may be deteriorated, and therefore, it is not so preferable.

The lower limit of the MD stretch ratio in the first stage is preferably 1.1 times, more preferably 1.3 times. If it is 1.1 times or more, a polyester resin with an intrinsic viscosity of 0.64 dl/g or more can be finally stretched in the lengthwise direction sufficiently by carrying weak stretching in the first stage, and accordingly, the productivity can be improved. The upper limit of the MD stretch ratio in the first stage is preferably 2 times, more preferably 1.6 times. If it exceeds 2 times, since the orientation of molecular chains in the lengthwise direction is so high that the stretching may become difficult in the second stage or thereafter and the film may have large unevenness in thickness, and therefore, it is not preferable.

The lower limit of the MD stretching temperature in the second stage (or final stage) is preferably 110° C., more preferably 115° C. If it is 110° C. or more, a polyester resin with an intrinsic viscosity of 0.64 or more can be sufficiently stretched in the lengthwise direction and can be stretched in the transverse direction in the next step, so that the unevenness in thickness in the lengthwise and transverse directions may be reduced. The upper limit of the MD stretching temperature is preferably 130° C., more preferably 125° C. If it exceeds 130° C., crystallization is promoted, so that the transverse stretching may become difficult or the unevenness in thickness may become significant, and therefore, it is not so preferable.

The lower limit of the MD stretch ratio in the second stage (or final stage) is preferably 2.1 times, more preferably 2.5 times. If it is less than 2.1 times, even if a polyester resin with an intrinsic viscosity of 0.64 or more is stretched to orient molecules in the lengthwise direction, the film may be torn in the next transverse stretching step or an extreme thickness defect may be caused, and therefore, it is not so preferable. The upper limit of the MD stretch ratio is preferably 3.5 times, more preferably 3.1 times. If it exceeds 3.5 times, since the orientation in the lengthwise direction is so high that the stretching may be impossible in the second stage or thereafter and the film may have significant unevenness in thickness, and therefore, it is not so preferable.

The lower limit of the TD stretching temperature is preferably 110° C., more preferably 120° C., and still more preferably 125° C. If it is less than 110° C., the stretching stress in the transverse direction is increased, so that the film may be torn or the unevenness in thickness may become extremely large, and therefore, it is not so preferable. The upper limit of the TD stretching temperature is preferably 150° C., more preferably 145° C., and still more preferably 140° C. If it exceeds 150° C., orientation of molecular chains does not increase, so that mechanical characteristics may be deteriorated, and therefore, it is not so preferable.

The lower limit of the transverse direction (TD) stretch ratio is preferably 3.5 times, more preferably 3.9 times. If it less than 3.5 times, molecular orientation is weak and mechanical strength may become insufficient, and therefore, it is not so preferable. Further, the orientation of molecular chains in the lengthwise direction is significant and the balance between the lengthwise and transverse directions is deteriorated to make the unevenness in thickness large, and therefore, it is not so preferable. The upper limit of the TD stretch ratio is preferably 5.5 times, more preferably 4.5 times. If it exceeds 5.5 times, the film may be torn, and it is not so preferable.

To obtain the film of the present invention, it is desirable to properly set the conditions for heat fixation carried out in a tenter after the completion of the TD stretching and for the subsequent cooling of the film to room temperature. As compared with a common poly(ethylene terephthalate) film containing no isophthalic acid, a polyester film containing a recycled resin derived from PET bottles and containing isophthalic acid has low crystallinity, tends to be melted in an ultra-fine level, and is poor in mechanical strength. Because of that, in the case where the polyester film is exposed to high temperatures under strain abruptly after completion of stretching, or in the case where the polyester film is abruptly cooled under strain after completion of heat fixation, the tensile force balance in the width direction is disordered due to inevitable temperature difference in the film width direction, and it results in unevenness in thickness and defective mechanical characteristics. On the other hand, when the heat fixation temperature is lowered to deal with the phenomenon, it is sometimes impossible to obtain sufficient lamination strength. In the present invention, it is recommended to carry out steps of heat fixation 1 at a rather lower temperature, heat fixation 2 (if necessary, heat fixation 3) at a sufficiently high temperature, and thereafter, gradual cooling to lower the temperature to room temperature after the stretching. However, the present invention is not limited to this method, and other recommended methods include a method of controlling the film tension correspondingly to the velocity of hot air in the tenter and the temperatures in the respective zones; a method of carrying out heat treatment at a relatively low temperature in a furnace with a sufficient length after completion of the stretching; and a method of relaxing the film by heat rolls after completion of the heat fixation.

As one example, a method by controlling the tenter temperature will be described.

The lower limit of the temperature in the heat fixation 1 is preferably 160° C., more preferably 170° C. If it is less than 160° C., the thermal shrinkage rate becomes significant finally and deviation and shrinkage may be caused at the time of processing, and therefore, it is not so preferable. The upper limit of the temperature in the heat fixation 1 is preferably 215° C., more preferably 210° C. If it exceeds 215° C., the film is abruptly exposed to a high temperature, so that the unevenness in thickness becomes significant or the film may be torn, and therefore, it is not so preferable.

The lower limit of the time for the heat fixation 1 is preferably 0.5 sec., more preferably 2 sec. If it is shorter than 0.5 sec, the film temperature increase may be insufficient. The upper limit of the time for the heat fixation 1 is preferably 10 sec., more preferably 8 sec. If it exceeds 10 sec., productivity may be deteriorated, and it is not so preferable.

The lower limit of the temperature in the heat fixation 2 is preferably 220° C., more preferably 227° C. If it is less than 220° C., the thermal shrinkage rate becomes significant, and deviation and shrinkage may be caused at the time of processing, and therefore, it is not so preferable. The upper limit of the temperature in the heat fixation 2 is preferably 240° C., more preferably 237° C. If it exceeds 240° C., the film may be melted, or even if not melted, the film may be fragile, and therefore, it is not so preferable.

The lower limit of the time for the heat fixation 2 is preferably 0.5 sec., more preferably 3 sec. If it is shorter than 0.5 sec., the film may be easily torn at the time of heat fixation, and therefore, it is not so preferable. The upper limit of the time for the heat fixation 2 is preferably 10 sec., more preferably 8 sec. If it exceeds 10 sec., sagging may occur and it may result in unevenness in thickness, and therefore, it is not so preferable.

The lower limit of the temperature in the case where the heat fixation 3 is carried out as necessary is preferably 205° C., more preferably 220° C. If it is less than 205° C., the thermal shrinkage rate becomes significant, and deviation and shrinkage may be caused at the time of processing, and therefore, it is not so preferable. The upper limit of the temperature in the heat fixation 3 is preferably 240° C., more preferably 237° C. If it exceeds 240° C., the film may be melted, or even if not melted, the film may be fragile, and therefore, it is not so preferable.

The lower limit of the time in the case where the heat fixation 3 is carried out as necessary is preferably 0.5 sec., more preferably 3 sec. If it is shorter than 0.5 sec., the film may be easily torn at the time of heat fixation, and therefore, it is not so preferable. The upper limit of the time for the heat fixation 3 is preferably 10 sec., more preferably 8 sec. If it exceeds 10 sec., sagging may occur and it may result in unevenness in thickness, and therefore, it is not so preferable.

TD relaxation may be carried out at any point in the heat fixation. The lower limit thereof is preferably 0.5%, more preferably 3%. If it is less than 0.5%, the thermal shrinkage rate particularly in the transverse direction becomes significant, and deviation and shrinkage may be caused at the time of processing, and therefore, it is not so preferable. The upper limit thereof is preferably 10%, more preferably 8%. If it exceeds 10%, sagging may occur and it may result in unevenness in thickness, and therefore, it is not so preferable.

The lower limit of the gradual cooling temperature after the TD heat fixation is preferably 90° C., more preferably 100° C. If it is less than 90° C., since the film contains isophthalic acid, the unevenness in thickness may become significant because of shrinkage by abrupt temperature change or the film may be torn, and therefore, it is not so preferable. The upper limit of the gradual cooling temperature is preferably 150° C., more preferably 140° C. If it exceeds 150° C., a sufficient cooling effect may not be caused, and therefore, it is not so preferable.

The lower limit of the gradual cooling time after the heat fixation is preferably 2 sec., more preferably 4 sec. If it is shorter than 2 sec., a sufficient gradual cooling effect may not be caused, and therefore, it is not so preferable. The upper limit is preferably 20 sec., more preferably 15 sec. If it exceeds 20 sec., it is sometimes disadvantageous in terms of productivity, and therefore, it is not so preferable.

EXAMPLES

Next, the present invention will be described in more detail with reference to examples and comparative examples, but the present invention should not be limited to these examples. Evaluation methods employed in the present invention are as follows.

(1) Content of Terephthalic Acid and Isophthalic Acid Components Contained in the Raw Material Polyester and the Polyester Composing the Film A sample solution was prepared by dissolving a sample in a solvent mixture of chloroform D (manufactured by Yurisoppu Co., Ltd.) and trifluoroacetic acid D1 (manufactured by Yurisoppu Co., Ltd.) at 10:1 (volume ratio). Using NMR (GEMINI-200 manufactured by Varian), protons in the obtained sample solution were measured by NMR under the conditions of a temperature of 23° C. and a number of integrations of 64. In the NMR measurement, a prescribed peak intensity of protons was calculated, and the content (mol %) of the terephthalic acid component and the isophthalic acid component in 100 mol % of acid components was calculated.

(2) Intrinsic Viscosity (IV) of a Raw Material Resin and a Resin Composing a Film After vacuum dried at 130° C. for whole day and night, a sample was pulverized or cut, and 80 mg of the sample was weighed, and heated and dissolved in a mixed solution of phenol/tetrachloroethane=60/40 (volume ratio) at 80° C. for 30 minutes. The volume was adjusted to 20 mL with the same mixed solution and thereafter, the measurement was carried out at 30° C. (unit: dl/g).

(3) Thickness

Measurement was carried out by PEACOCK dial gauge (manufactured by OZAKI Mfg. Co., Ltd.).

(4) Thermal Shrinkage Rate in Lengthwise and Transverse Directions

A film was sampled in 10 mm width and marked at every 200 mm with marked lines, and the intervals (L0) between neighboring marked lines were measured. Thereafter, the film was sandwiched between sheets of paper and treated in a hot air oven controlled to 150° C. for 30 minutes, and then taken out. Thereafter, the intervals (L) between marked lines were measured and the thermal shrinkage rate was calculated according to the following equation. Sampling was carried out in both the lengthwise direction and the transverse direction for the measurement. Besides that, the measurement was carried out according to JIS-C-2318.

$$\text{Thermal shrinkage rate (\%)} = \{(L0-L)/L0\} \times 100$$

(5) Refractive Index in the Thickness Direction

The refractive index (Nz) in the thickness direction was measured according to JIS K 7105 using an Abbe's refractometer (manufactured by ATAGO Co., Ltd.). Sodium D ray was employed as a light source, a test piece with a refractive index of 1.74 was used, and methylene iodide was used as an intermediate liquid.

(6) Lamination Strength

The produced biaxially stretched polyester film and a polyethylene film (L4102 manufactured by Toyobo Co., Ltd.) were laminated using a urethane type adhesive (TM 569, CAT 10L, and ethyl acetate at 33.6:4.0:62.4 (weight ratio) manufactured by Toyo-Morton, Ltd.) by a dry lamination method and aged at 40° C. for 4 days to obtain a laminate for lamination strength evaluation. Herein, the lamination conditions were a line velocity of 20 m/min, a drier temperature of 80° C., and an application amount after drying of 3 g/m². The laminate was cut into a specimen having a size of 15 mm in width and 200 mm in length, and the peel strength (N/15 mm) at the interface between the untreated surface of the polyester film and the polyolefin resin layer was measured under the conditions of a temperature of 23° C. and a relative humidity of 65% by using Tensilon model UMT-II-500 manufactured by Toyo Baldwin. The tensile speed was 20 cm/min and the peel angle was 180 degrees.

(7) Appearance Evaluation after Laminate Separation

The sample after the evaluation of (6) was visually observed. The ○ level means that there are no micro voids of the adhesive in the surface after separation: the Δlevel means that there are micro voids in 10% or less of the total separated surface area: and the x level means that there are micro voids in more than 10% of the total separated surface area.

(8) Unevenness in Thickness

The thickness Tn (n=1 to 200) (unit: μm) of a film of 1 m in length and 1 m in width was measured at every 5 mm and at 200 points in the lengthwise and transverse directions by using PEACOCK dial gauge (manufactured by OZAKI Mfg. Co., Ltd.), and the maximum thickness was defined as Tmax, the minimum thickness was defined as Tmin, and the average thickness was defined as Tave. The unevenness in thickness was calculated according to the following equation (1).

$$\text{Unevenness in thickness} = \{(T\max - T\min)/T\text{ave}\} \times 100(\%) \quad (1)$$

Example 1

Preparation of a Polyester Resin Obtained by Recycling PET Bottles

A recycled polyester raw material was obtained by washing PET bottles for beverages to remove foreign matters such as the remaining beverage, thereafter melting the flakes obtained by pulverizing the PET bottles by an extruder, further changing the filter with a filter having a smaller mesh size, then separating the fine foreign matters by filtration twice, and then separating the fine foreign matters by third filtration using a filter with the smallest mesh size of 50 μm. The obtained resin had a composition of terephthalic acid/isophthalic acid//ethylene glycol=97.0/3.0//100 (mol %), and the intrinsic viscosity of the resin was 0.70 dl/g. The resin was named as a polyester A.

(Production of a Film)

A film was produced using a poly(ethylene terephthalate) resin of terephthalic acid//ethylene glycol=100//100 (mol %) as a polyester B having an intrinsic viscosity of 0.62 dl/g, and a master batch containing, as a polyester C, the polyester B and 0.3% of amorphous silica with an average particle diameter of 1.5 μm. The respective raw materials were dried at 125° C. under a reduced pressure of 33 Pa for 8 hours. These raw materials were mixed in a manner that A/B/C became 70/20/10 (weight ratio) and charged into a uniaxial extruder. The temperature was set so as to keep the resin temperature at 280° C. from the extruder to a melt line, a filter, and a T-die. Here, the temperature was set so as to adjust the resin temperature to 305° C. for 30 seconds from the starting point of a compaction part of a screw of the extruder and thereafter to 280° C. again.

The melt extruded out of the T-die was attached closely to a cooling roll to obtain an unstretched sheet. Then, the unstretched sheet was stretched (MD1) 1.41 times in the lengthwise direction with rolls heated to 118° C. and having different circumferential speeds, and further stretched (MD2) 2.92 times in the lengthwise direction with rolls heated to 128° C. and having different circumferential speeds. The vertically stretched sheet was led to a tenter, preheated at 121° C., and thereafter transversely stretched 4.3 times at 131° C. Then, for heat fixation, the sheet was subjected to treatment at 180° C. without relaxation (0%) for 2.5 seconds (TS1), thereafter to treatment at 231° C. with 5% of relaxation for 3.0 seconds (TS2), and further to treatment at 222° C. without relaxation for 2.5 seconds (TS3). Then, the sheet was cooled in the same tenter at 120° C. for 6 seconds and finally wound with a winder to obtain a biaxially stretched polyester film having a thickness of 18 μm.

Example 2

A biaxially stretched polyester film having a thickness of 18 μm was obtained by the same method as that in Example 1, except that the polyester raw materials were mixed in a manner that A/B/C could be 80/10/10 (weight ratio).

Example 3

A biaxially stretched polyester film was obtained by the same method as that in Example 2, except that the resin temperature was set at 305° C. for 45 seconds from the starting point in the compaction part of the screw in the extruder and the final thickness of the film was changed to 12 μm.

Examples 4 and 5

Preparation of a Polyester Resin Obtained by Recycling PET Bottles

A recycled polyester raw material was obtained by washing PET bottles for beverages different from those in Example 1 to remove foreign matters such as the remaining beverage, thereafter melting the flakes obtained by pulverizing the PET bottles by an extruder, further changing the filter with a filter having a smaller mesh size, then separating the fine foreign matters by filtration twice, and then separating the fine foreign matters by third filtration using a filter with the smallest mesh size of 50 μm. The obtained resin had a composition of terephthalic acid/isophthalic acid//ethylene glycol=95.0/5.0//100 (mol %), and the intrinsic viscosity of the resin was 0.70 dl/g. The resin was named as a polyester D.

(Production of a Film)

A biaxially stretched polyester film having a thickness of 18 μm was obtained by the same method as that in Example 1, except that the polyester raw materials were mixed in a manner that D/B/C could be 60/30/10 (Example 4) and 80/10/10 (Example 5).

Comparative Example 1

A biaxially stretched polyester film having a thickness of 18 μm was obtained by the same method as that in Example 2, except that the film was subjected to treatment at 231° C. with 5% of relaxation for 3.0 seconds (TS2), and then to treatment at 222° C. without relaxation for 2.5 seconds (TS3) as heat fixation after completion of transverse stretching, and TS1 and the cooling step were not performed.

Comparative Example 2

A biaxially stretched polyester film having a thickness of 18 μm was obtained by the same method as that in Example 2, except that the resin temperature was set at 280° C. in the entire region from the extruder to the melt line, the filter, and the T-die.

Comparative Example 3

A resin with an intrinsic viscosity of 0.70 dl/g was produced by a normal polymerization method from terephthalic acid/isophthalic acid//ethylene glycol=90.0/10.0//100 (mol %). The resin was named as a polyester E. A biaxially stretched polyester film having a thickness of 18 μm was obtained by the same method as that in Example 2, except that the polyester raw materials were changed to E/B/C=55/35/10 (weight ratio).

Comparative Example 4

The temperature was set so as to keep the resin temperature at 280° C. from the extruder to the melt line, the filter, and the T-die. Here, the temperature was set so as to adjust the resin temperature to 305° C. for 90 seconds from the starting point of the compaction part of the screw of the extruder and thereafter to 280° C. again. The film production conditions for the film were heating to 100° C. by roll groups and an infrared heater, and thereafter vertical stretching 4.1 times by roll groups with different circumferential speeds, and then transverse stretching 4.2 times at 130° C. A biaxially stretched polyester film having a thickness of 18 μm was obtained by the same method as that in Example 2, except that the film was subjected to treatment at 229° C. without relaxation for 2.6 seconds (TS2) and then to treatment at 200° C. with 6.0% of relaxation for 2.5 seconds as heat fixation, and TS1 and the cooling step were not performed.

Comparative Example 5

The temperature was set so as to keep the resin temperature at 280° C. from the extruder to the melt line, the filter, and the T-die. Here, the temperature was set so as to adjust the resin temperature to 305° C. for 90 seconds from the starting point of the compaction part of the screw of the extruder and thereafter to 280° C. again. The melt extruded out of the T-die was attached closely to a cooling roll to obtain an unstretched sheet. Then, the unstretched sheet was stretched (MD1) 1.2 times in the lengthwise direction with rolls heated to 110° C. and having different circumferential speeds and further stretched (MD2) 2.8 times in the lengthwise direction with rolls heated to 120° C. and having different circumferential speeds. The vertically stretched sheet was led to a tenter, preheated at 100° C., and thereafter transversely stretched 3.9 times at 105° C. A biaxially stretched polyester film having a thickness of 18 μm was obtained by the same method as that in Example 2, except that the film was subjected to treatment at 228° C. without relaxation for 3.0 seconds (TS2) and then to treatment at 228° C. with 5.0% of relaxation for 2.5 seconds as heat fixation, and TS1 and the cooling step were not performed.

Comparative Example 6

A resin with an intrinsic viscosity of 0.65 dl/g was produced by a normal polymerization method from terephthalic acid/isophthalic acid//ethylene glycol=97.0/3.0//100 (mol %). The resin was named as a polyester F. Polyester raw materials were mixed in a manner that F/B/C could be 80/10/10 (weight ratio), and the resin temperature was set at 310° C. in the entire region from the extruder to the melt line, the filter, and the T-die. The melt extruded out of the T-die was attached closely to a cooling roll to obtain an unstretched sheet. Then, the unstretched sheet was stretched (MD1) 1.6 times in the lengthwise direction with rolls heated to 126° C. and having different circumferential speeds, further stretched (MD2) 1.3 times in the lengthwise direction with rolls heated to 126° C. and having different circumferential speeds, and further stretched (MD3) 2.3 times in the lengthwise direction with rolls heated to 118° C. and having different circumferential speeds. The vertically stretched sheet was led to a tenter, preheated at 110° C., and thereafter transversely stretched 4.6 times at 120° C. A biaxially stretched polyester film having a thickness of 18 μm was obtained by the same method as that in Example 2, except that the film was thereafter subjected to treatment at 205° C. without relaxation for 5.0 seconds (TS2) as heat fixation, and TS1, TS3 and the cooling step were not performed.

Comparative Example 7

The temperature was set so as to keep the resin temperature at 280° C. from the extruder to the melt line, the filter, and the T-die. Here, the temperature was set so as to adjust the resin temperature to 300° C. for 70 seconds from the starting point of the compaction part of the screw of the extruder and thereafter to 280° C. again. The melt extruded out of the T-die was attached closely to a cooling roll to obtain an unstretched sheet. Then, the unstretched sheet was stretched (MD1) 3.9 times in the lengthwise direction with rolls heated to 107° C. and having different circumferential speeds. The vertically stretched sheet was led to a tenter and preheated at 105° C. and 115° C. for 2 seconds each, respectively, and thereafter transversely stretched finally 4.1 times in 4 stretching zones of 120° C., 130° C., 145° C., and 155° C. for 2 seconds, respectively. Then, for heat fixation, the sheet was subjected to treatment at 220° C. without relaxation (0%) for 2.0 seconds (TS1), thereafter to treatment at 235° C. without relaxation for 2.0 seconds (TS2), and further to treatment at 195° C. with 2.0% of relaxation for 2.5 seconds (TS3). A biaxially stretched polyester film having a thickness of 18 μm was obtained by the same method as that in Example 2, except that no cooling step was performed and the sheet was finally wound with a winder.

Comparative Example 8

The polyester raw materials were changed as B/C=90/10 (weight ratio), the resin temperature was set at 280° C. from the extruder to the melt line, the filer and the T-die, but the resin temperature was set so as to be 300° C. for 30 seconds from the starting point of the compaction part of the screw of the extruder and thereafter to 280° C. again. A biaxially stretched PET film was obtained by the same method as that in Comparative Example 7, except that the final thickness was changed to 31 μm.

The biaxially stretched PET films obtained in Examples 1 to 5 were reduced in the unevenness in thickness and were excellent in lamination strength, and had good appearance after lamination.

On the other hand, in the case of Comparative Example 1, since there was no TS1 and no cooling step, the unevenness in thickness was significant because of shrinkage or the like due to abrupt temperature change. In the case of Comparative Example 2, since the temperature in the compaction part of the screw was low, the resin was melted insufficiently and the unevenness in thickness was significant. In the case of Comparative Example 3, since the content of the isophthalic acid component was high and the crystallinity was low, the resin was soft and the applied force was insufficient in the stretching, and thus the unevenness in thickness was significant. Comparative Example 4 was an experiment replicating the contents described in Patent Document 1, and since the TS3 temperature was low, the refractive index in the thickness direction was low and the lamination strength was insufficient. Comparative Example 5 was an experiment replicating the contents described in Patent Document 2, and since the TD stretching temperature was low and there was no cooling step after the heat fixation, the unevenness in thickness was significant due to abrupt cooling. Comparative Example 6 was an experiment replicating the contents described in Patent Document 3, and the MD stretching was carried out in three stages. In Comparative Example 6, the extrusion temperature was as high as 310° C., and therefore, the intrinsic viscosity of the film became low, relaxation in the heat fixation was insufficient, and the thermal shrinkage rate was high. Comparative Example 7 was an experiment replicating the contents described in Patent Document 4, and since there was no cooling step after the heat fixation, the unevenness in thickness was significant due to abrupt cooling. In Comparative Example 8, since no recycled raw materials derived from PET bottles were used, gradual cooling was performed by lowering the TS3 temperature to make the unevenness in thickness slight. However, due to an insufficient temperature for TS3, the refractive index in the thickness direction was low, and the lamination strength was insufficient.

TABLE 1

| raw material composition | Example 1 | Example 2 | Example 3 | Example 4 | Example 5 | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|---|---|---|
| resin composition | PET/I | PET/I | PET/I | PET/I | PET/I | PET/I | PET/I | PET/I | PET/I | PET/I | PET/I | PET/I | PET |
| content of a terephthalic acid component in all dicarboxylic acid components in the entire polyester resin composing the polyester film (mol %) | 97.9 | 97.6 | 97.6 | 97.0 | 96.0 | 97.6 | 97.6 | 94.5 | 97.6 | 97.6 | 97.6 | 97.6 | 100.0 |
| content of a isophthalic acid component in all dicarboxylic acid components in the entire polyester resin composing the polyester resin (mol %) | 2.1 | 2.4 | 2.4 | 3.0 | 4.0 | 2.4 | 2.4 | 5.5 | 2.4 | 2.4 | 24 | 2.4 | 0.0 |
| content of an isophthalic acid component in all dicarboxylic acid components in the recycled resin derived from PET bottles (mol %) | 3 | 3 | 3 | 5 | 5 | 3 | 3 | not contain | 3 | 3 | not contain | 3 | not contain |
| intrinsic viscosity of the recycled resin derived from PET bottles (dl/g) | 0.7 | 0.7 | 0.7 | 0.7 | 0.7 | 0.7 | 0.7 | | 0.7 | 0.7 | | 0.7 | |
| content of the resin obtained by recycling PET bottles (wt %) | 70 | 80 | 80 | 60 | 80 | 80 | 80 | | 80 | 80 | | 80 | |
| lubricant | silica | silica | silica | silica | silica | silica | silica | silica | silica | silica | silica | silica | silica |
| lubricant content (wt %) | 0.03 | 0.03 | 0.03 | 0.03 | 0.03 | 0.03 | 0.03 | 0.03 | 0.03 | 0.03 | 0.03 | 0.03 | 0.03 |

(Resin composition)
PET/I: a mixture of polyethylene terephthalate and polyethylere terephthsilate copolymerized with an isophtalic acid component
PET: polyethylene terephthalate only

TABLE 2

| film production condition | Example 1 | Example 2 | Example 3 | Example 4 | Example 5 | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|---|---|---|
| set temperature in the resin melting part (excluding the highest set temperature in the compaction part of the screw in the extruder) (°C) | 280 | 280 | 280 | 280 | 280 | 280 | 280 | 280 | 280 | 280 | 310 | 280 | 280 |
| highest set temperature in the compaction part of the screw in the extruder (°C) | 305 | 305 | 305 | 305 | 305 | 305 | 280 | 305 | 305 | 305 | 310 | 300 | 300 |
| time for the resin to pass the region at the highest set temperature in the compaction part of the screw in the extruder (sec) | 30 | 30 | 45 | 30 | 30 | 30 | 0 | 30 | 90 | 90 | 0 | 70 | 30 |
| MD stretching temperature (°C) | — | — | — | — | — | — | — | — | 100 | — | — | 107 | 107 |
| MD stretch ratio (—) | — | — | — | — | — | — | — | — | 4.1 | — | — | 3.9 | 3.9 |
| MD stretching temperature in the first stage (°C) | 118 | 118 | 118 | 118 | 118 | 118 | 118 | 118 | — | 110 | 126 | — | — |
| MD stretch ratio in the first stage (—) | 1.41 | 1.41 | 1.41 | 1.41 | 1.41 | 1.41 | 1.41 | 1.41 | — | 1.2 | 1.6 | — | — |
| MD stretching temperature in the second stage (°C) | 128 | 128 | 128 | 128 | 128 | 128 | 128 | 128 | — | 120 | 126 | — | — |
| MD stretch ratio in the second stage (—) | 2.92 | 2.92 | 2.92 | 2.92 | 2.92 | 2.92 | 2.92 | 2.92 | — | 2.8 | 1.3 | — | — |
| MD stretching temperature in the third stage (°C) | — | — | — | — | — | — | — | — | — | — | — | — | — |
| MD stretch ratio in the third stage (—) | — | — | — | — | — | — | — | — | — | — | — | — | — |
| TD stretching temperature (°C) | 131 | 131 | 131 | 131 | 131 | 131 | 131 | 131 | 130 | 105 | 118 | 120-155 | 120-155 |
| TD stretch ratio (—) | 4.3 | 4.3 | 4.3 | 4.3 | 4.3 | 4.3 | 4.3 | 4.3 | 4.2 | 3.9 | 2.3 | 4.1 | 4.1 |
| temperature in the heat fixation (TS1) (°C) | 180 | 180 | 180 | 180 | 180 | no | 180 | 180 | no | no | 120 | 220 | 120-155 220 |
| time for the heat fixation (TS1) (sec) | 2.5 | 2.5 | 2.5 | 2.5 | 2.5 | — | 2.5 | 2.5 | — | — | 4.6 | 2.0 | 2.0 |
| temperature in the heat fixation (TS2) (°C) | 231 | 231 | 231 | 231 | 231 | 231 | 231 | 231 | 229 | 228 | 205 | 235 | 235 |
| time for the heat fixation (TS2) (sec) | 5 | 5 | 5 | 5 | 5 | 5 | 5 | 5 | 0 | 0 | 0 | 0 | 0 |
| relaxation rate (%) | 3.0 | 3.0 | 3.0 | 3.0 | 3.0 | 3.0 | 3.0 | 3.0 | 2.6 | 3.0 | 5.0 | 2.0 | 2.0 |
| temperature in the heat fixation (TS3) (°C) | 222 | 222 | 222 | 222 | 222 | 222 | 222 | 222 | 200 | 228 | no | 195 | 195 |
| time for the heat fixation (TS3) (sec) | 0 | 0 | 0 | 0 | 0 | 0 | 0 | 0 | 6 | 5 | — | 2 | 2 |
| relaxation rate (%) | 2.5 | 2.5 | 2.5 | 2.5 | 2.5 | 2.5 | 2.5 | 2.5 | 2.5 | 2.5 | — | 2.5 | 2.5 |
| cooling temperature after the heat fixation (°C) | 120 | 120 | 120 | 120 | 120 | 120 | 120 | 120 | no | no | no | no | no |
| cooling time after the heat fixation (sec) | 6 | 6 | 6 | 6 | 6 | no | 6 | 6 | — | — | — | — | — |

TABLE 3

| evaluation result | Example 1 | Example 2 | Example 3 | Example 4 | Example 5 | Comparative Example 1 | Comparative Example 2 | Comparative Example 3 |
|---|---|---|---|---|---|---|---|---|
| intrinsic viscosity of the resin composing the film (dl/g) | 0.65 | 0.66 | 0.66 | 0.65 | 0.66 | 0.66 | 0.68 | 0.66 |
| thickness (μm) | 18 | 18 | 12 | 18 | 18 | 18 | 18 | 18 |
| MD thermal shrinkage (%) | 0.8 | 0.7 | 0.3 | 1 | 1.3 | 0.9 | 1 | 1.3 |
| TD thermal shrinkage (%) | 0.5 | 0.5 | 0.5 | 1 | 1.1 | 0.6 | 0.9 | 1.1 |
| refractive index in the thickness direction (Nz) | 1.4955 | 1.4961 | 1.4952 | 1.4963 | 1.4963 | 1.4971 | 1.4991 | 1.4972 |
| MD unevenness in thickness (%) | 6.2 | 6.8 | 7.6 | 9.7 | 11.6 | 18.4 | 17.6 | 18.8 |
| TD unevenness in thickness (%) | 5.8 | 0.6 | 6.4 | 8.2 | 10.2 | 17.2 | 185 | 19.0 |
| lamination strength (N/15 mm) | 5.5 | 6.3 | 6.1 | 6.4 | 6.8 | 5.3 | 5.9 | 6.8 |
| appearance evaluation after the lamination | ○ | ○ | ○ | ○ | ○ | x | x | Δ |

| evaluation result | Comparative Example 4 | Comparative Example 5 | Comparative Example 6 | Comparative Example 7 | Comparative Example 8 |
|---|---|---|---|---|---|
| intrinsic viscosity of the resin composing the film (dl/g) | 0.62 | 0.61 | 0.58 | 0.63 | 0.63 |
| thickness (μm) | 18 | 12 | 15 | 18 | 31 |
| MD thermal shrinkage (%) | 0.6 | 1 | 2.1 | 0.8 | 0.8 |
| TD thermal shrinkage (%) | 0.9 | 0.8 | 1.7 | 06 | 0.6 |
| refractive index in the thickness direction (Nz) | 1.4922 | 1.4955 | 1.4985 | 1.4967 | 1.4927 |
| MD unevenness in thickness (%) | 115 | 19.8 | 17.8 | 16.6 | 8.4 |
| TD unevenness in thickness (%) | 11.7 | 19.1 | 16.1 | 16.9 | 7.7 |
| lamination strength (N/15 mm) | 38 | 4.7 | 5.5 | 5.9 | 3.9 |
| appearance evaluation after the lamination | o | x | x | x | o |

INDUSTRIAL APPLICABILITY

According to the present invention, it is made possible to provide a polyester film containing a polyester resin obtained by recycling high-quality PET bottles, and more particularly, it is made possible to provide a polyester film containing a polyester resin obtained by recycling PET bottles and having low thermal shrinkage, high lamination strength, and slight unevenness in thickness.

DESCRIPTION OF REFERENCE SIGNS

1 Screw
2 Flight
3 Barrel
4 Supply part
5 Compaction part
6 Measurement part

The invention claimed is:

1. A biaxially stretched polyester film comprising 50 wt. % or more and 95 wt. % or less of a polyester resin produced by recycling PET bottles, the polyester film satisfying the following requirements:

(1) the content of an isophthalic acid component in all dicarboxylic acid components in the entire polyester resin composing the polyester film is 0.5 mol % or more and 5.0 mol % or less;
(2) the intrinsic viscosity of the resin composing the polyester film is 0.64 dl/g or more and 0.80 dl/g or less;
(3) the thermal shrinkage rate at 150° C. in the lengthwise direction and the transverse direction is 0.1% or more and 1.5% or less;
(4) the refractive index of the polyester film in the thickness direction is 1.4930 or more and 1.4995 or less; and
(5) the unevenness in thickness calculated according to the following equation is 16% or less in both the lengthwise and transverse directions, in the case where each thickness Tn (n=1 to 200) (unit: μm) of a film of 1 m in length and 1 m in width is measured at every 5 mm and at 200 points, and the maximum thickness is defined as Tmax, the minimum thickness is defined as Tmin, and the average thickness is defined as Tave:

Unevenness in thickness=${(Tmax-Tmin)/Tave}\times 100(\%)$.

2. The polyester film according to claim 1, wherein the polyester film contains 0.01 wt. % or more and 1 wt. % or less of inorganic particles.

* * * * *